United States Patent
Rakib et al.

(10) Patent No.: US 6,426,983 B1
(45) Date of Patent: Jul. 30, 2002

(54) METHOD AND APPARATUS OF USING A BANK OF FILTERS FOR EXCISION OF NARROW BAND INTERFERENCE SIGNAL FROM CDMA SIGNAL

(75) Inventors: Selim Shlomo Rakib, Cupertino; Yoram Zarai, San Jose, both of CA (US)

(73) Assignee: Terayon Communication Systems, Inc.

( * ) Notice: Subject to any disclaimer, the term of this patent is extended or adjusted under 35 U.S.C. 154(b) by 0 days.

(21) Appl. No.: 09/152,645

(22) Filed: Sep. 14, 1998

(51) Int. Cl.[7] .............................. H03D 1/04; H03D 1/06
(52) U.S. Cl. ......................................................... 375/346
(58) Field of Search ................................. 375/346, 348, 375/350, 316, 143, 152, 234, 229

(56) References Cited

U.S. PATENT DOCUMENTS 3,988,679 A * 10/1976 Clarke et al. ................. 325/377
5,325,204 A * 6/1994 Scarpa ........................ 348/607

OTHER PUBLICATIONS

A. Ranheim, "Narrowband Interference Rejection in Direct Sequence Spread Spectrum System Using Time–Frequency Decomposition, 8049i IEEE Proceedings—Communications, 1442 (1995 Dec., No. 6, pp. 393–400".

"Analysis of DFT–Based Frequency Excision Algorithms for Direct–Sequence Spread–Spectrum Communication", Jeffrey A. Young and James S. Lehnert, *IEEE Transactions on Communications*, vol. 46, No. 8, Aug. 1998, pp. 1076–1087.

Proceedings of the IEEE Third International Symposium on Spread Spectrum Techniques & Application, ISEEE ISSSTA '94, Jul. 4–6, 1994, University of Oulu, Oulu, Finland, vol. 2/2, pp. 521–525.

* cited by examiner

*Primary Examiner*—Mohammad H. Ghayour
(74) *Attorney, Agent, or Firm*—Ronald C. Fish; Ronald Craig Fish, a Law Corporation

(57) ABSTRACT

A narrow band interference excision circuit for use in broadband digital data communication systems such as CDMA systems. The excision circuit is comprised of a matrix of polyphase filters that divide the input signal into a plurality of narrow subbands. Each narrow subband signal is examined to determine if narrowband interference exists in that bin. This is done preferably by computing the average power of the subband signal. If a signal in a bin has an average power greater than some adjustable or adaptive threshold, then the entire subband signal is eliminated. A bank of polyphase synthesis filters reassembles the composite signal. An equalization circuit with an error predictor comprised of an adaptive FIR filter is coupled to adapt coefficients of the filter and generate a colored noise cancellation signal to remove colored noise from the input to the slicer.

23 Claims, 7 Drawing Sheets

PRIOR ART CDMA RECEIVER

PASSBANDS OF FOUR DIFFERENT
ANALYSIS FILTERS

PRIOR ART DFE

METHOD AND APPARATUS OF USING A BANK OF FILTERS FOR EXCISION OF NARROW BAND INTERFERENCE SIGNAL FROM CDMA SIGNAL

FIELD OF USE

The invention is useful in code division multiple access digital data transmission systems and other digital data transmission systems using carriers to eliminate or substantially reduce narrow band noise power.

In a paper by Jeffrey A. Young and James Lehnert, entitled "Analysis of DFT-based Frequency Excision Algorithms for Direct-Sequence Spread-Spectrum Communications" published in August 1998 in IEEE Transactions on Communications, Vol. 46, No. 8, p. 1076 (hereafter the Young paper), the authors describe a discrete Fourier transform type frequency excision algorithm to eliminate narrow band noise from direct-sequence spread-spectrum modulation. The authors note that processing gain limits the interference rejection capability of unaided direct-sequence spread-spectrum modulation. The prior art contains numerous narrow band interference rejection techniques called frequency excision algorithms to extend the interference rejection capability of spread spectrum systems beyond the processing gain limits. This is an important ability to overcome severe interference situations when strong narrow band spurious signals are received along the spread spectrum signal.

This frequency excision capability is highly desirable in, for example, the new digital data delivery systems for delivering high bandwidth telephone service, video on demand and high speed internet access to subscribers on cable TV systems via the hybrid fiber-coax cable plant. Frequency excision also allows transmitted power levels to be reduced.

The prior art adaptive notch filtering techniques described in references 1–3 of the Young paper are noted to be cumbersome and adapt slowly to the frequency of the interfering signal. Adaptive A/D conversion described in reference 4 of the Young paper works for a single CW interference source but cannot be easily generalized to multiple interference sources. Transform domain signal processing using SAW filters described in references 5–11 of the Young filter promises wide communication bandwidths and rapid adaptation to changing interference. However, a drawback to using SAW filters is that they limit the linear dynamic range and, hence, limit the immunity to multiple interferers. A class of excision algorithms called adaptive digital filtering (ADF) described in references 7, and 12–16 of the Young paper, is very large and consists of adaptive transversal filtering, classical filtering with parameter estimation, lattice filtering and decision-feedback filtering. ADF provides a wide variety of estimation algorithms with varying response times, but the algorithms that were study by Young and his co-author were limited in the number of interferers that can be rejected by the number of delays (poles and zeroes). Young notes that the advantage of discrete Fourier transform (DFT) based frequency excision is the ability to handle multiple interference sources and the ability to adapt rapidly. The class of DFT algorithms studied by Young are described in references 17–25 of the Young paper. DFT algorithms differ from SAW filter based techniques in that digital technology is used which yields greater freedom in designing the interference removal algorithm and easily provide high dynamic range. The number of interfering signals that can be removed is related to the length of the DFT and may easily extend into the hundreds for a 1024 point DFT and notch depths on the order of 60 dB can be achieved.

However, DFT excision algorithms are software based. Because of this fact, they are too slow for many applications where data rates and traffic volume are very high such as in digital service delivery over cable modem based systems.

In a 1994 paper by Kohri, An Interference Suppressor for CW and Narrow-Band Signals Using Filter Bank on CDMA Communications, published Jul. 4–6, 1994 at the University of Oulu, Oulu, Finland in the proceedings of the IEEE ISSSTA '94, Kohri proposed a narrowband interference suppressor using a bank polyphase FIR decimating (dividing) filters, a limiter and a bank of combining or interpolator filters at the front end of a CDMA receiver. The transfer function of the filter bank was a series of individual, non-overlapping transfer functions, and no error predicting equalizer was taught to cancel colored noise. Likewise, perfect reconstruction filters were not taught. The limiter was taught as a nonlinear amplifier. The fact that nonoverlapping transfer functions for the filters were used means there will be blind spots in the interference suppressor which could let narrow band interference signals through. The fact that perfect reconstruction filters are not taught, means that the filter banks themselves can introduce distortions in the spread spectrum signal which can cause errors in the payload data.

Therefore, a need has arisen for a narrow band excision algorithm or machine that can deeply notch multiple interfering signals rapidly at the data rates of cable modem systems.

SUMMARY OF THE INVENTION

A narrow band interference excision circuit for use in any broadband digital data communication systems such as CDMA or TDMA systems is disclosed herein. "Broadband" as the term is used herein means any transmitted signal with as broad bandwidth such as code division multiplexed signals or TDMA signals where the symbol rate is high. Basically, TDMA signals with a symbol rate approaching or exceeding the chip rate of CDMA systems has as high a bandwidth or higher for the transmitted signals as CDMA signals. The term "transmitted signal" or "transmitted signals" in the claims is intended to include both TDMA and CDMA signals as well as any other broad bandwidth transmitted signal that could have narrow bandwidth interfering signals therein.

In the preferred embodiment, the excision circuit is comprised of a bank of analysis filters and a bank of synthesis filters separated by an excision circuit. Together, these two collections of filters implement a set of perfect reconstruction filters. The analysis filters function to divide the input signal into a plurality of narrow subbands and have overlapping frequency responses so as to eliminate blind spots in analyzing the entire broadband spectrum. Each narrow subband signal is examined continuously or iteratively to determine if narrowband interference exists in that bin at the time of each iteration. This is done preferably by computing the power of the signals in each subband. If the power in a subband exceeds a threshold, preferably adaptable, then the entire subband is eliminated. This threshold is set so as to detect most instances of narrowband interference. Alternative embodiments take the average power in every bin or do an FFT of every bin to look for noise peaks or compute the variance of the signal amplitude or power at every frequency from the mean and, if any peak exceeds some threshold delta value (which may be programmable or adaptive in some embodiments), the bin is erased or a notch filter is programmed to take out the peak. Since this process is carried out iteratively on every bin, interfering signals which have their bandwidth increase and decrease cause as many bins as they infect at any particular iteration to be erased and to continue to be erased on subsequent iterations until the interference level drops below the threshold delta value for those bins. In other words, the process is an ongoing evaluation of every bin, and every bin that is infected with an interfering signal on any particular iteration will be erased or suppressed.

A bank of polyphase synthesis filters reassembles the composite signal.

Polyphase filters and the Noble Identity are used to enable lowering the complexity of the filter structure by using decimators to lower the sample rate entering each filter and performing interpolation after the synthesis bank to raise the sample rate back up the sample rate going into the decimators. In alternative embodiments, polyphase filters need not be used and more complex analysis and synthesis filter banks are used and more complex detection and cancellation circuits are used so as to be able to work at the higher sample rate.

An equalization circuit with an error predictor comprised of an adaptive FIR filter is coupled to adapt coefficients of the filter and generate a colored noise cancellation signal to remove colored noise from the input to the slicer.

DETAILED DESCRIPTION OF THE PREFERRED AND ALTERNATIVE EMBODIMENTS

Figure 1:
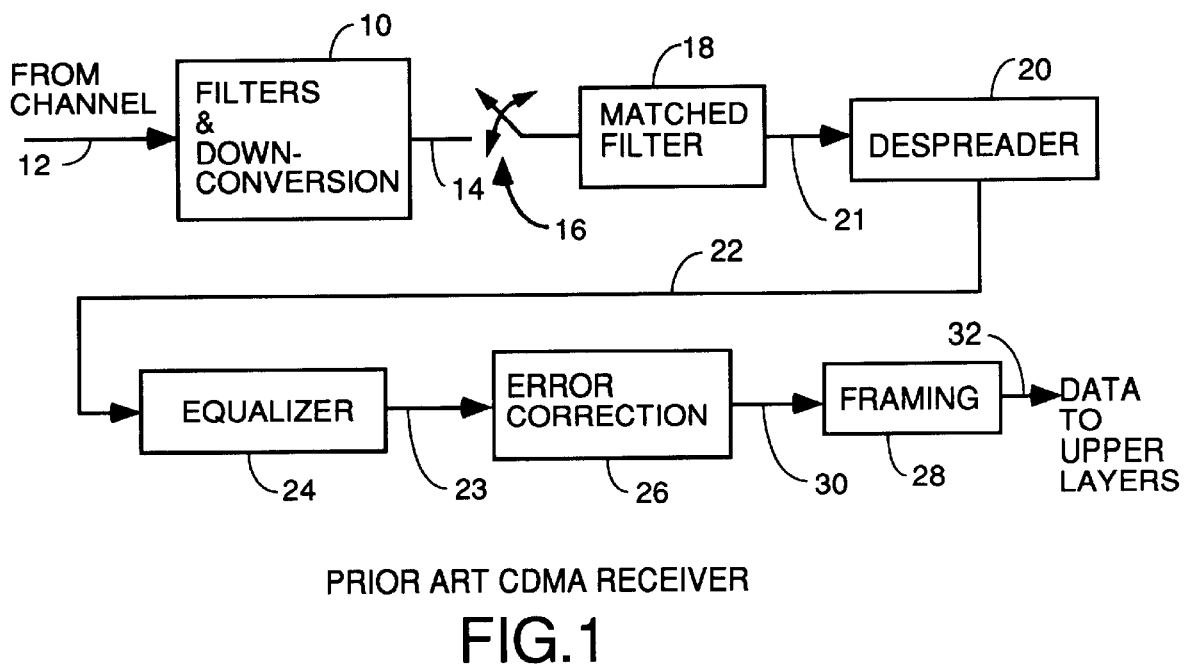
FIG. 1 is a block diagram of a typical CDMA receiver in which the invention finds utility.

Referring to FIG. 1, there is shown a typical CDMA receiver in which the invention may be usefully employed. The filtering system of the invention is useful in any digital communication system using carriers and broadband waveforms where narrow bandwidth strong interfering signals can occur. Many spread spectrum systems including not only direct sequence but also pulsed FM chirp systems transmit their signals using wide bandwidths. Those skilled in the art are advised that the invention is useful to eliminate narrowband interference in any broad bandwidth communication system, and the claims are not intended to be limited to direct-sequence spread-spectrum CDMA systems transmitting digital data over cable TV media, although that is an environment in which the invention is useful.

In the particular application in which the assignee employs the invention, a headend or central unit (hereafter CU) is coupled to one or more remote units or RUs by a hybrid fiber coaxial cable network of a cable television system. In the receiver of FIG. 1, a filter and down conversion circuit 10 bandpass filters the analog signals on channel 12 using a passband centered on the upstream channel frequency if the receiver is in the CU. The passband is centered on the downstream channel frequency if the receiver is in a remote unit or RU (frequency division multiplexing is assumed to separate upstream and downstream digital data spread spectrum analog signals on the shared channel). A down converter in circuit 10 then converts the filtered analog signal back down to a baseband signal on line 14. An analog-to-digital converter 16 then samples the analog signal to generate a plurality of digital samples. A matched filter 18 then digitally filters the samples back to their original pulse shapes. That is, the transfer function of a matched filter is the complex conjugate of the signal to which it is matched. A baseband digital matched filter having a transfer function matched to the transmitted signal acts as a synchronizer and act as conjugate signal generators when the signal to which the filter is matched appears at its input. The delay line based matched filter is intended to recognize a particular code sequence to which it is matched. Each delay segment has a delay equal to the period of the chip clock so that each segment contains energy corresponding to one chip in the sequence at any particular time. Matched filters and the other components of the receiver are described in Dixon, Spread Spectrum Systems with Commercial Applications (3rd Ed. 1994) Wiley & Sons, ISBN 0-471-59342-7, and Haykin, Communication Systems (3rd Ed. 1994) Wiley & Sons, ISBN 0-471-57178-8, both of which are hereby incorporated by reference. Also incorporated by reference herein are: Horowitz and Hill, The Art of Electronics, (Second Edition 1984) Cambridge University Press, ISBN 0-521-37095-7; Data and Computer Communications by Dr. William Stallings, Macmillan Publishing Co., New York (4th Ed. 1994) ISBN 0-02-415441-5; Lee and Messerschmit, Digital Communication, (2d Ed., 1994) Kluwer Academic Publishers, Boston, ISBN 0 7923 93910; Elliott, Handbook of Digital Signal Processing: Engineering Applications, (Academic Press, Inc. San Diego, 1987), ISBN 0-12-237075-9; Oppenheim & Schafer, Digital Signal Processing (1975) Prentice Hall, Englewood Cliffs, N.J. ISBN 0 13 214635 5.

After resynchronization in the matched filter, a despreader 20 demultiplexes the spread spectrum signal using an inverse code matrix to the code matrix that was used in the transmitter to spread the symbol data. The resulting signal on line 22 is input to an equalizer 24 which functions to correct for the non ideal channel response. The corrected output signal from the equalizer is error corrected by an error correction circuit using the redundant ECC bits added to the payload data in the transmitter. A framer circuit 28 reassembles the data into frames or packets of the type used by the upper layer protocols such as by constructing MPEG2 packets from the error corrected data on line 30. The resulting reframed data is output to the upper layer protocols for further processing on line 32.

Figure 2:
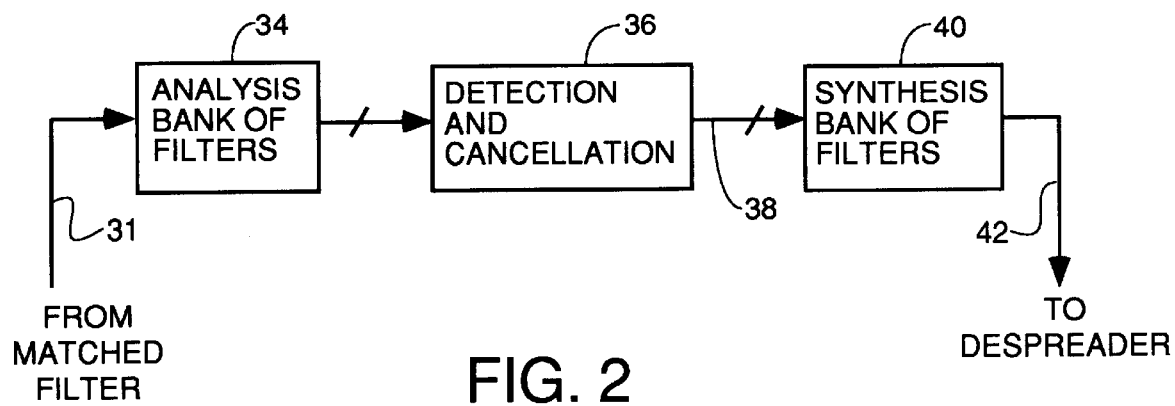
FIG. 2 is a block diagram of the highest level of functionality of the narrowband excision circuit.

To employ a narrowband excision circuit in the receiver of FIG. 1, the invention employs a filter circuit like that shown in FIG. 2 on bus 21 coupling the matched filter 18 to the despreader 20. The narrow band interference excision filter of FIG. 2 is comprised of a bank of narrow bandpass filters 34 each of which has a different center frequency and a passband which overlaps slightly with the passbands of its neighboring filters on either side so as to prevent blind spots.

The function of the bank of bandpass filters 34 is to provide a plurality of output signals each of which represents the energy of the incoming signal in a narrow frequency range corresponding to the passband limits of that particular filter. This allows narrow bandwidth interference signals to be isolated in individual frequency bins for analysis and excision. In the preferred embodiment, 256 individual subband filters with overlapping frequency responses are used to cover a 4 MHz wide CDMA signal bandwidth. The number of filters used is a tradeoff depending upon the bandwidth to be covered, the amount of hardware complexity and associated cost that can be tolerated and the typical bandwidth of the interfering signals most commonly encountered. Ideally, the frequency response selected for each filter will be such that the subbands are not much wider than the most frequently encountered interference signal so as to prevent loss of useful signal information when an entire bin is suppressed because of the presence of an interference signal. However, use of fewer analysis filters with wider bandwidths is acceptable because of a loose coupling between the bandwidth of the individual subbands and loss of payload data when an entire subband is suppressed. This result follows because the energy of the payload data is spread out among all bins so the loss of any one or a few of them is not terribly damaging to recovery of data in the receiver.

After separating the input waveform into subband energy components in a plurality of narrow frequency ranges (hereafter referred to as bins), a detection and cancellation circuit examines each bin to determine if a narrow bandwidth interference signal is present in that bin. If so, the amplitude of all the signals in the bin is reduced to zero in the preferred embodiment. In other embodiments, the amplitude of all frequency components in the bin including is attenuated to some small amplitude. This reduces the amplitude of the narrow band interference source to a level which is low enough to insure that it will not cause enough interference to exceed the error detection and correction capability of the ECC bits added to the payload data.

In the preferred embodiment, the method carried out by the detection and cancellation circuit of determining if a narrow band interference signal is present in a bin is by computing the average power of all the signals in the bin or subband and comparing that average power to a threshold, preferably an adaptable threshold. This threshold is set so as to detect most instances of narrowband interference. If the power in a subband is found to exceed the threshold (the same threshold is used for every bin in SCDMA), then the magnitudes of all signal in that subband are set to zero. Another way of detecting the presence of an interfering signal is by taking an average of the absolute amplitudes of the waveform at each frequency in the bin. The absolute amplitude of the waveform at each frequency in the bin is then compared to this average. If at some frequency, a peak is found with an amplitude which exceeds the average by more than some predetermined amount (a programmable value in some embodiments), then the bin is deemed to have an interference signal present. This notion works in a CDMA system because spread spectrum systems are very wide bandwidth systems where the energy of the payload data is spread out over the wide bandwidth. This tends to cause the transmitted signal to have a power density similar to white noise. This means that every bin will have a signal in it that does not vary wildly in amplitude, and the average power of the signals in all bins will be almost the same. The higher the number of spreading codes that are used, the more true this becomes. Thus, a narrow bandwidth interference signal will stand out like the proverbial "sore thumb".

The calculation of the average absolute amplitude of the signal at each of the frequencies in each bin is an adaptive process which is ongoing in real time. The same is true for each of the alternative methods described herein of determining when there is an interference signal present.

Figure 3:
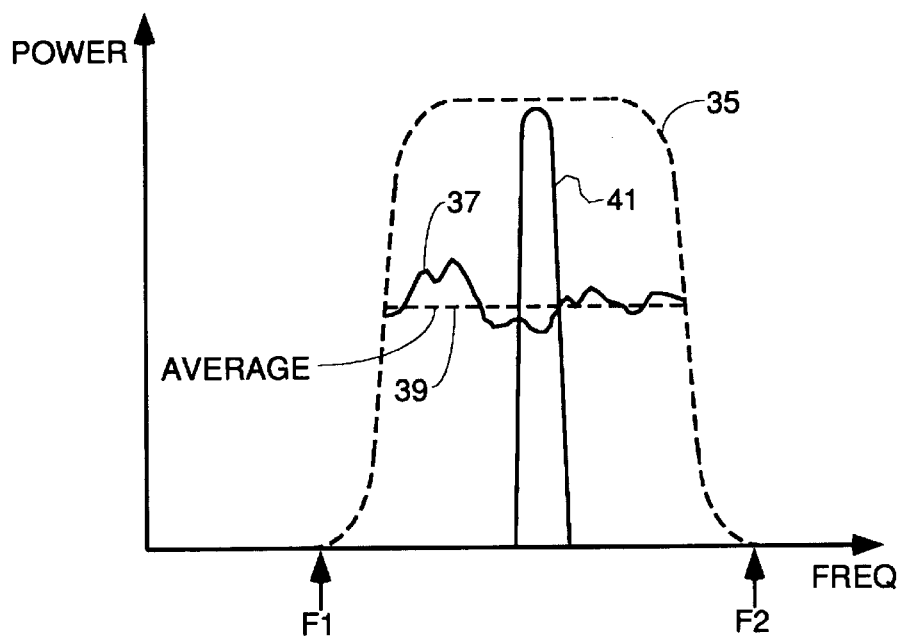
FIG. 3 is diagram of the frequency response of a single analysis filter and the subband signals within showing an average absolute magnitude and a narrowband interference peak.

If an interference signal is found in a bin, an attenuator or other suitable circuitry in detection and cancellation circuit 36 causes the amplitude of the waveform at all frequencies in this bin to be attenuated to zero or some other small value. FIG. 3 illustrates this concept. In alternative embodiments, instead of attenuating every frequency in the bin, a narrow bandwidth bandstop or notch filter may be used. If a digitally tunable notch filter is associated with each detection and cancellation circuit assigned to a particular bin, the comparison process, upon locating an interference peak in the bin, can send a digital parameter to the notch filter to center its notch on the center frequency of the interference signal. In some embodiments, the comparison process determines how wide the bandwidth of the interference signal is as well as its center frequency, and sends digital parameters to the notch filter to move its center frequency to the center frequency of the interference and which also alter the frequency response of the notch filter to adjust the bandwidth of the stop band or notch to correspond with the bandwidth of the interference signal.

The notch filters in detection and cancellation circuit 36 may be in an array having one filter which is associated with each bin. Since it is unlikely that every bin will have an interference signal therein, it is also possible to save on hardware complexity and use an array of notch filters which is not as large as the number of bins. Individual filters in this array may be selectively connected to the individual conductors of bus 38 to excise the interference signals out of the signals on the individual lines of bus 38 in response to control data from the circuitry that does the detection process.

In an alternative embodiment, an array of notch filters may be incorporated in the synthesis bank of filters so as to be selectively coupled to filter the combined output signal on line 42 in response to control data from the detection circuitry in block 36. The switching circuitry must be such that if two or more interfering signals are detected by the detection circuit 36, a like number of notch filters may be tuned to have their notches centered on the center frequency of the interference signals and then connected in series with bus 42 to filter each interference signal out of the combined signal.

Referring to FIG. 3, there is shown a power versus frequency plot of the signal in one bin which happens to have a narrow bandwidth interference signal present. Line 35 represents the shape of the filter passband that creates the bin. This skirt shape is defined by the transfer function of the filter. The waveform of the spread spectrum signal is represented by signal 37. The signal 41 represents a narrowband interference signal. The dashed line 39 represents the average power density of signals 41 and 37 combined by superposition. To detect the presence of the interference signal 41, the detection and cancellation circuit compares the average power of the combined signals 41 and 37 in the bin, and if the average power exceeds a a threshold, preferably an adaptable threshold, then the bin is deemed to contain an interfering signal, and all the signals in the subband are eliminated.

The process carried out by the detection and cancellation circuit is carried out in every bin or subband created by the bank of filters 34, so multiple interfering signals can be removed simultaneously.

In alternative embodiments, other ways of detecting the presence of an interfering signal in a bin may also be used. For example, the average power of the waveform may be calculated by squaring the amplitude of the amplitude at every frequency, summing the squares and dividing by the number of frequencies. The power of the waveform at every frequency is then compared to the average power for the bin, and if any frequency has a peak having a power level which is greater than a predetermined amount above the average, that bin is deemed to have an interfering signal.

Another way of detecting an interfering signal in a bin is to do a Fourier transform on the samples that define the waveform in every bin and then look at the resulting frequency components for noise peaks which exceed the average amplitude of the other frequency components in the bin by a predetermined amount. In other words, a processor is programmed to calculate a Fourier Transform of the signal in each subband and calculate the average amplitude of all the Fourier components in each subband, and, in each subband, compare the amplitudes of the Fourier components that result from the Fourier Transform calculation to the average amplitude of the Fourier components in the subband to determine if any component exceeds the average by more than a predetermined amount. Any subband which has one or more Fourier components that exceed the average by the predetermined amount is deemed to have narrowband interference present.

Another way of detecting the presence of an interfering signal is to calculate the average absolute amplitude in the bin and then compute the variance of the amplitude from some variance threshold selected to give a reliable indication of the presence of narrowband interference. If any amplitude exceeds a predetermined amount of acceptable variance, the bin is deemed to have an interference signal present.

Another way of detecting the presence of an interfering signal is to compute the average amplitude or power in each bin and compare the average to the average of the same averages of each of the other bins or subbands. Any bin with an interfering signal will have an average which is substantially higher than the averages of bins which do not have interfering signals present. If any bin has an average that is higher than the other averages by a predetermined (possibly programmable) amount, that bin is deemed to have an interfering signal present.

After the interfering signal or signals have been removed, the resulting signals in the subbands on the buses are input to a synthesis bank of filters 40. The function of the synthesis bank of filters is to put all the component signals in the time domain on buses 38 back together as a single composite signal on bus 42.

The combined system comprised of filter bank 34, detection and cancellation circuit 36 and synthesis bank of filters is called a quadrature mirror filter (QMF) bank comprised of known digital FIR filters for the analysis bank 34 and the synthesis bank 40. Not just any FIR filters will work however for these two banks of filters. It is important that the coefficients of these filters be selected such that the combination of analysis and synthesis filters in the filter banks fall within the subclass of FIR filters called perfect reconstruction filters. This means that if the analysis bank and the synthesis bank are connected back to back (with the detection and cancellation circuit eliminated) the output signal generated from the samples output by the synthesis bank 40 on bus 42 would be identical to the input signal defined by the samples on bus 31 with some constant delay and constant gain present. Perfect reconstruction filters are used for best performance in the preferred embodiment of the invention. Although other filters could be used for the analysis and synthesis banks, the performance would not be optimal and may even be unacceptable.

However, the "perfect reconstruction filters" that are preferred are not actually perfect. Because a finite resolution (the number of filters M in the analysis bank 34 is not infinite) and because the filter response of the analysis and synthesis filters is not perfect, even after excision and reconstruction, there will still be some residual interference on bus 42. This interference can be modelled as colored noise. This colored noise will be eliminated by an error prediction circuit that will be described below. Since the main energy of the narrow band interference signal was eliminated by the QMF filter system, the assumption can be made that the error prediction system works with no decision errors.

Figure 4:
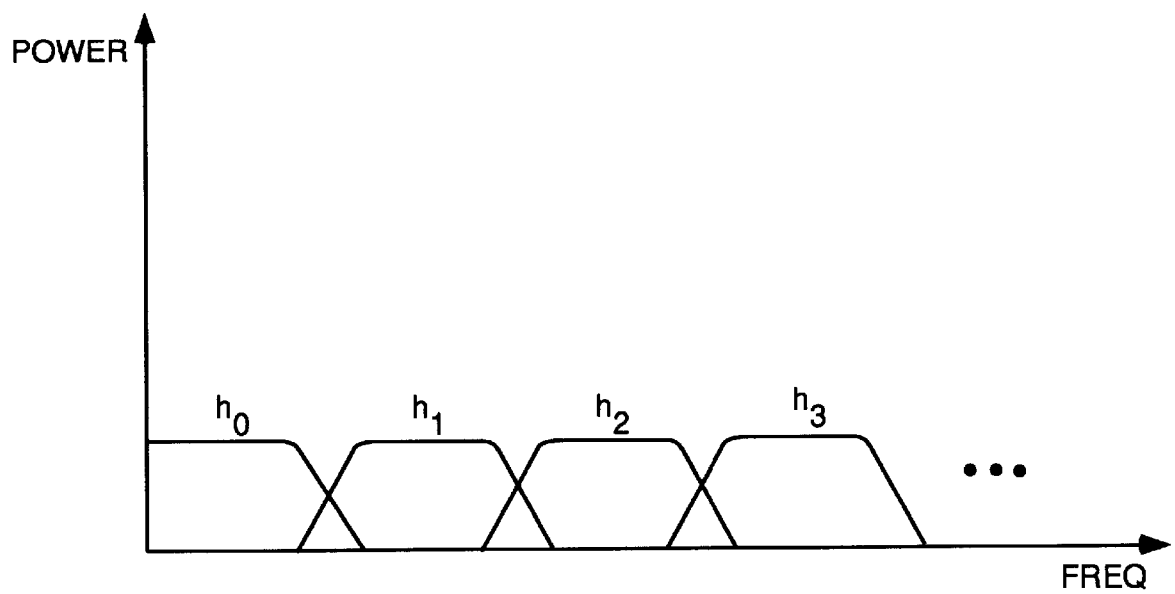
FIG. 4 is a diagram of the overlapping frequency responses of the filters in the analysis filter bank.

FIG. 4 is a graph showing a typical set of frequency responses for the analysis filters of filter bank 34. Although the preferred embodiment uses overlapping frequency responses defining the subbands to avoid blind spots, other embodiments can use marginally overlapping or non-overlapping frequency responses or frequency responses that overlap more than is shown. The number of analysis filters in the analysis bank 34 determines the bandwidth of the frequency response of each filter.

Figure 5:
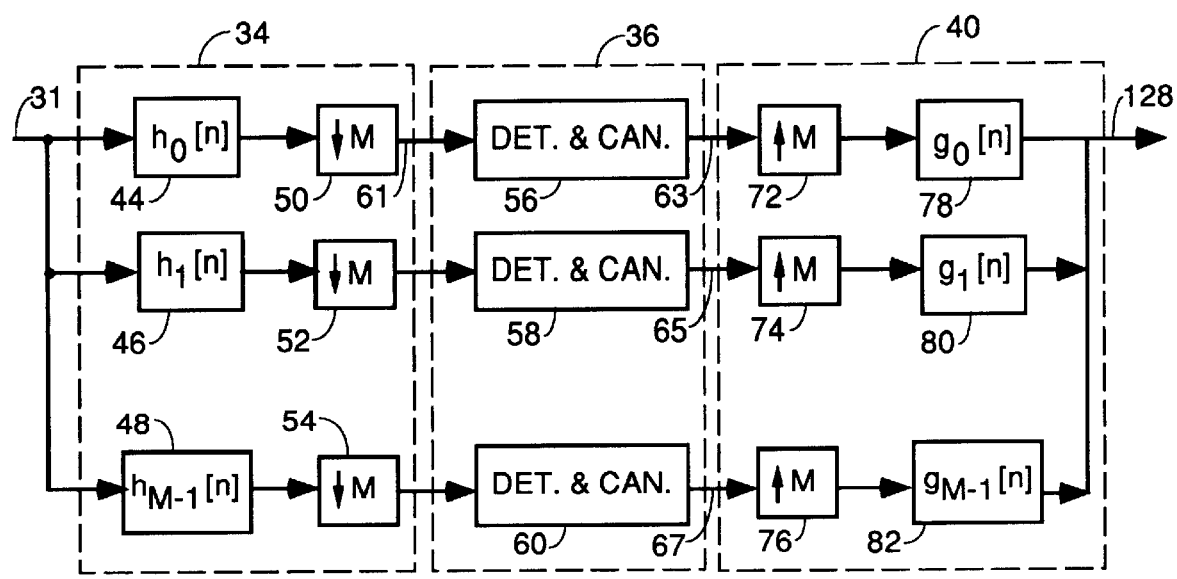
FIG. 5 is a block diagram of one embodiment for a narrowband excision circuit which does not use polyphase filters and the Noble Identity.

FIG. 5 shows a more detailed block diagram of the QMF filter structure of FIG. 2. The analysis bank of filters 34 is comprised of a plurality of M narrow passband "brickwall" bandpass filters with very low side lobes designated hI where I increments from 0 to M−1. Each of these filters (when combined with its paired synthesis filter less the intermediary detection and cancellation circuit) is a filter from the known subgenus of FIR filters known as "perfect reconstruction filters" or "near-perfect reconstruction filters" and is selected to have low side lobes in its frequency response. Many "brickwall filters" with sharp skirt rolloff and narrow passbands have high side lobes. Use of filters with high side lobes is not desirable for an excision circuit since when a bin is found to have a narrowband interference source therein, it is desired to remove all energy from the interference source. When brickwall filters are used with high side lobes, energy from the interference source is not limited to the bin in which the interference source was found but also spills out into adjacent bins. Thus, an excision circuit would have to not only erase the bin in which the energy was found but also erase all adjacent bins which overlap with a sidelobe of the filter whose main passband passed the interference signal. This is too high a penalty in lost payload data. Thus, brickwall filters without high side lobes are the preferred form of filter for the analysis filters.

Any "perfect reconstruction filter" or "near perfect reconstruction" filter from the prior art which is designed with coefficients to define a narrow "brickwall" passband frequency response with low side lobes will suffice for the analysis and synthesis filters.

Low side lobes, means that the frequency response has a passband like that shown in the idealized frequency response curve 35 in FIG. 3 with little side lobe activity to avoid signals or components having frequencies below F1 or above F2 through to the output. Preferably, each of these filters 44, 46, 48 etc. is from the genus of FIR or digital finite impulse response filters, although digital IIR filters could also be used, and, if the receiver front end was analog, analog SAW filters could also be used.

Decimators 50, 52 and 54 etc. function to lower the sample rate. The sample rate of the wide band signal on bus 31 has to be high enough to satisfy the Nyquist criterion to prevent aliasing. However, the FIR analysis filters 44 etc. modify the samples in accordance with their transfer function to output samples which define a narrow frequency band. The sample rate is maintained however, and it does not have to be that high when working with the narrow bandwidth subband signals. Therefore, each decimator lowers the sample rate by eliminating, for example, every other sample (decimation by two). This allows the circuitry to be simpler and less expensive to build. The decimators decimate by a factor of M thereby taking only every Mth sample and ignoring the rest. There is no synchronization between the decimators as to which Mth samples in the sequences they receive they each take, i.e., the Mth samples taken by the sequence of decimators do not form a sequence of sequential samples.

Figure 6:
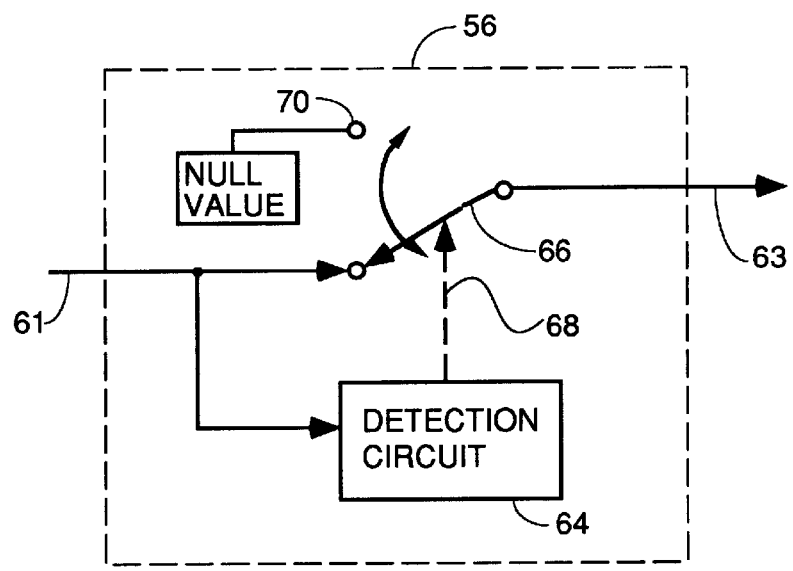
FIG. 6 is a block diagram of one embodiment for a detection and cancellation circuit.

FIG. 6 is a diagram of one embodiment for the detection and cancellation circuits 56, 58 and 60 that comprise block 36 in FIG. 2. The narrowband samples arrive on bus 61 and are coupled to a detection circuit 64 that computes the average absolute amplitude or other criteria used or does an FFT on the samples from the bin. The detection circuit controls the position of a switch 66 via a control signal symbolized by dashed arrow 68. If the detection circuit detects no interference signal present, it leaves switch 66 in the position shown so the samples pass unattenuated through the circuit and are output on bus 63. If the detection circuit determines that an interference signal is present, signal 68 is altered to cause switch 66 to connect bus 63 to terminal 70 which is connected to a null value thereby completely eliminating the samples on bus 61 from the group of samples that will be converted by synthesis bank 40 back into a single signal represented by a single group of samples. An alternative embodiment for the cancellation portion of the detection and cancellation circuits would be a switching circuit which imposes an adaptable notch filter in the signal path when a narrowband interference source is found and sets the coefficients of the notch filter to substantially match the center frequency of the notch filter with the center frequency of the narrowband interference signal. In some embodiments, the notch filter could have a fixed bandwidth and attenuation value and in other embodiments, the bandwidth and/or attenuation value could be programmable or adaptable.

The combination of FIR filters and decimators to the left of the detection and cancellation circuits in FIG. 5 can be implemented as known polyphase filters which have lower complexity. This is made possible by lowering the sample rate using decimators 50, 52 and 54 etc. and raising it back up using interpolators 72, 74 and 76 etc. Further, the lower sample rate also reduces the complexity of the detection and correction circuits 56, 58 and 60 etc. since each can work at a sample rate lower by a factor of M than the sample rate on bus 31. For example, the detection circuit 64 will have to far fewer mathematical operations and comparisons to calculate the average amplitude or power or do an FFT where there are fewer samples per second. This makes the algorithm simpler and reduces the performance requirements of the processor doing the calculations to get all the mathematical manipulations that need to be done in real time done within the time available to do them. It is simply easier to do all this mathematical manipulation at the lower sample rate especially since no information is being lost by lowering the sample rate.

In alternative embodiments, where the higher complexity and higher speed requirements on the processing circuitry to do detection and cancellation can be tolerated, the decimators and interpolators can be eliminated.

The sample outputs from the detection and cancellation circuits are input to interpolators 72, 74 and 76. The function of these interpolators is to raise the sample rate back up to the rate of bus 31 by inserting zeroes where the omitted samples were on each of buses 63, 65 and 67 etc.

The sample streams output by each of the interpolators 72, 74 and 76 etc. are input to another filter gI forming part of the synthesis filter bank, of which filters 78, 80 and 82 etc. are typical. Each of these gI filters is preferably an FIR filter having a transfer function which is the inverse of the transfer function of its paired filter hI in the "perfect reconstruction filter". If the two transfer functions were convolved in the time domain, the result would be one. The reason the system of FIG. 2 is called a Quadrature Mirror Filter is because the g filters each have transfer functions in the time domain which are each a mirror of the corresponding h filters. The inverse transfer functions between the h and g filters are what makes the pair of filters a perfect reconstruction filter. The theory of polyphase filters is that any digital filter regardless of the number of its coefficients can be broken down into a plurality of subfilters which, when their outputs are combined, yield the same signal as the original filter would have yielded. The equations defining the nature of polyphase filters and the Noble identity are well known, but are included here for completeness. There are two functions H(z) and GI(z) in the frequency domain which define polyphase filters. They are related by the following relationship:

$$H(z) = \text{the summation of } z{-}I{*}GI(zM) \text{ for } I=0 \text{ to } I=M{-}1$$

where z is the frequency variable in the frequency domain and M is the number of subband filters to be used. There is a relationship between the frequency domain function GI(zM) and the time domain function gI as follows:

$$GI(z) = \text{the summation for } n \text{ incrementing from negative infinity to plus infinity of } gI{*}z{-}n{=}h{+}I]$$

with I=greater than or equal to zero and less than or equal to M−1.

Figure 7:
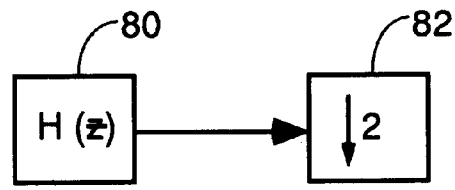
FIG. 7 is an illustration of a combination of a digital filter and decimator which can be implemented using a polyphase filter.

FIG. 7 represents an implementation example for a decimating filter with M=2. In FIG. 7, block 80 represents a standard filter having a frequency domain representation of its transfer function equal to H(z). Block 82 represents a decimation by 2 where every other sample is eliminated.

Figure 8:
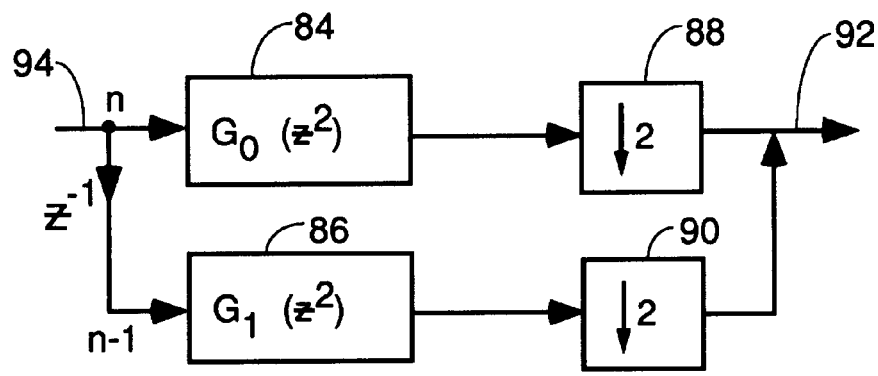
FIG. 8 is an illustration of a polyphase implementation of the filter of FIG. 7 with M=2.

The polyphase representation of the decimating filter of FIG. 7 with M=2 is shown in FIG. 8. In FIG. 8, two filters 84 and 86 with transfer functions in the frequency domain of G0(z2) and G1(z2), respectively, each have their outputs decimated by a factor of 2 by decimators 88 and 90, and the outputs are combined on bus 92. Note that filter 84 works on the nth sample and filter 86 works on the n−1 sample with both filters working at the high sample rate of bus 94.

By using the Noble Identity, the structure of FIG. 8 can be reversed so that decimators 88 and 90 are coupled to bus 94 and serve to lower the sample rate by a factor of 2 with their output sample streams coupled to the data inputs of two filters 96 and 98 having transfer functions in the frequency domain of G0(z) and G1(z), respectively, which are related by the equations above to the transfer functions H(z) of filter 80 in FIG. 7. This allows filters 96 and 98 to be simpler since they can work at half the sample rate of bus 94. If filter 80 has 10 coefficients, the filters 98 and 96 will each have 5 coefficients, which taken together, are the same as the 10 coefficients of filter 80 in FIG. 7. Likewise, if M is equal to 10 and filter 80 has 10 coefficients, each of the 10 GI(z) filters in the structure like that of FIG. 9 which would result from using the Noble Identity would each have one coefficient. Where 10 coefficients are used in filter 80 and M=2, filter 96 would have the odd numbered coefficients and filter 98 would have the even numbered coefficients.

The concept of using polyphase filters and the Noble Identity can be extended to any number M, e.g., M=3, 4 etc. Typically, 256 filters are used thereby greatly simplifying filter construction and allowing filtering in real time of very high data rates to cancel narrowband noise. It is not necessary to use the noble identity, but it is preferred since it allows the digital filters to work at a much lower sample rate. Use of the polyphase filter technique in conjunction with application of the noble identity allows a simpler physical structure that can be implemented by less complex and expensive filters to implement the hI(n) and the gI(n) filters in FIG. 5. By using polyphase filter implementation and the Noble Identity, the structure of FIG. 5 can be implemented as the structure shown in FIG. 10.

Figure 9:
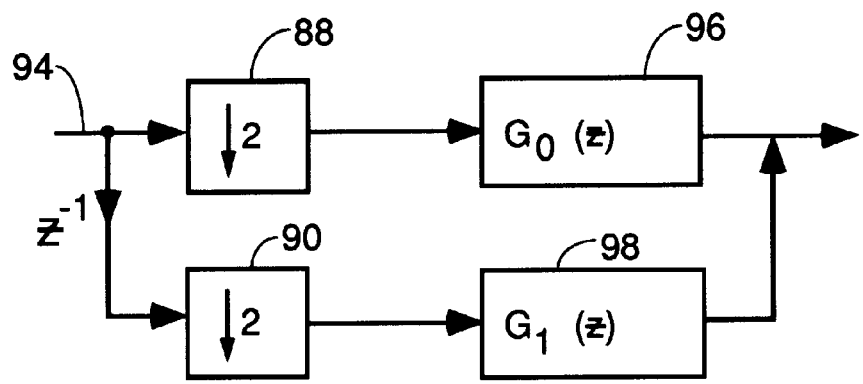
FIG. 9 is an illustration of a polyphase implementation of the filter of FIG. 7 with M=2 after utilization of the Noble Identity.
Figure 10:
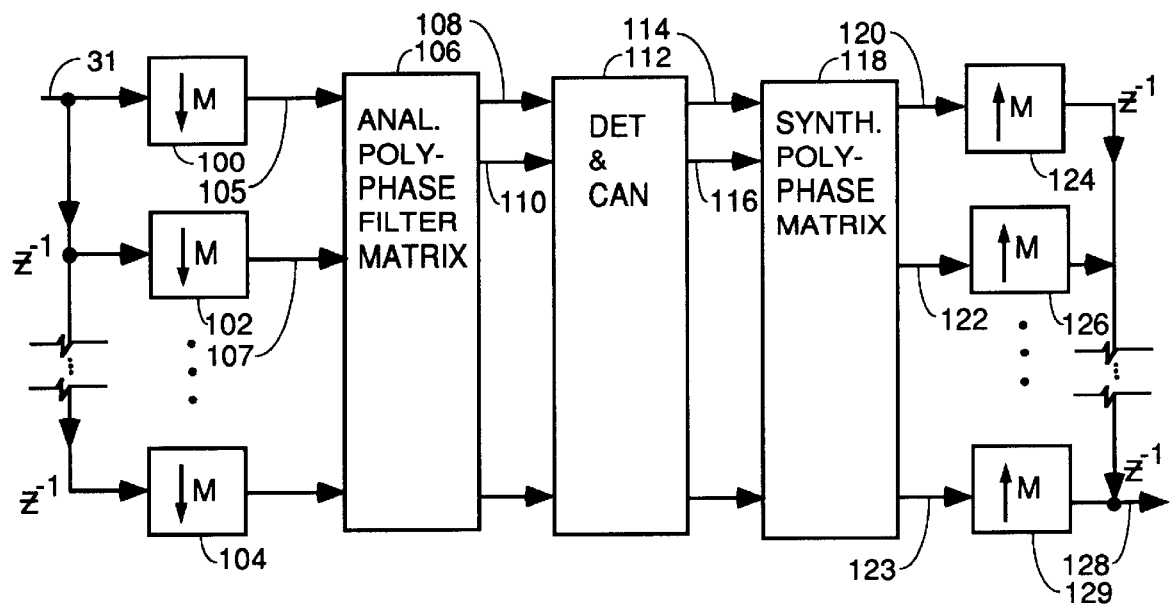
FIG. 10 is a polyphase implementation of the narrowband excision circuit of FIG. 5 using the Noble Identity, decimators and interpolators.

In FIG. 10, a series of decimators 100, 102 and 104 etc. down convert the sample rate on bus 31 by a factor of M. Each resulting stream is input to a separate data input of an analysis polyphase filter matrix 106. These separate data inputs are represented by buses 105 and 107 etc. This matrix is comprised of a collection of type 1 polyphase filters, each polyphase filter doing the job of a single hI(n) subband filter in FIG. 5 and having a structure such as is shown in FIG. 9 but expanded to whatever value is selected for M. Each analysis filter Hk(z) can be represented by a type 1 polyphase filter as the summation from I=0 to I=M−1 of z−IEkI(zM). This defines a matrix of filters defined by the matrix comprised of a plurality of rows, the first row starting with E00(z) and ending with E0,M−1(z) and the first column starting with E00(z) and ending with EM−1,0(z), and the last row starting with EM−1,0(z) and ending with EM−1,M−1(z). Likewise, each synthesis filter Fk(z) can be represented by a type 2 polyphase filter represented as the summation from I=0 to I=M−1 of z−(M−1−I)RkI(zM). The matrix of polyphase filters defined by this relationship to implement the bank of synthesis filters is comprised of comprised of a plurality of rows, the first row starting with R00(z) and ending with R0,M−1(z) and the first column 30 starting with R00(z) and ending with RM−1,0(z), and the last row starting with RM−1,0(z) and ending with RM−1,M−1(z).

Each polyphase filter has a separate output, represented by buses 108, 110 etc. These outputs are coupled to separate inputs of a detection and cancellation matrix 112 which is comprised of a collection of individual detection and cancellation circuits such as those shown in FIG. 6. Each detection and cancellation circuit has its own output, represented by buses 114, 116 etc. These outputs are coupled to individual data inputs of a synthesis polyphase filter matrix comprised of a collection of type 2 polyphase filters, each type 2 polyphase filter doing the job of one of the gI(n) filters in FIG. 5. The outputs of the synthesis polyphase filters such as buses 120 and 122 are coupled to data inputs of interpolators represented by blocks 124, 126 etc. The output sample streams of the interpolators are combined on bus 128 for output to the rest of the receiver circuitry for despreading etc.

Figures 11, 12:
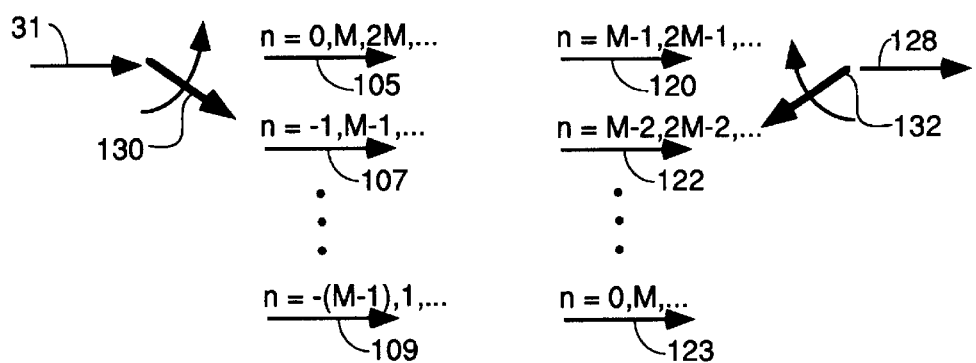
FIG. 11 is a diagram showing how commutator switches can be used to implement the decimators of FIG. 10.
FIG. 12 is a diagram showing how commutator switches can be used to implement the interpolation of FIG. 10.

The decimators and interpolator structures of FIG. 10 can be represented by the commutator structures of FIGS. 11 and 12, respectively. FIG. 11 illustrates one way of implementing the decimators 100, 102 through 104 in FIG. 10 using a commutator switch represented by movable vector 130. The input sample stream on bus 31 enters the input of the switch. The individual data inputs 105, 107 etc. of the analysis filter matrix 106 are represented by the lines to the right of the movable vector 130. The movable vector 130 represents a switch arm that moves selectively to couple bus 31 to each one of the data inputs 105, 107 through 109 in a sequence so that sequential digital samples are coupled to sequential data inputs. Of course, a mechanical switch arm is not actually used because it would not able to move fast enough, so switch arm 130 is symbolic of any form of electronic switching circuit that functions in the way described herein.

The commutator switch arm is operated so as to sequentially connect samples to sequential inputs. For example, when the −(M−1) sample (the sample that arrived at the switch input M−1 samples in time before the 0th sample) arrives at the input of switch 130, switch 130 is operated to couple bus 31 to the Mth data input 109. When the next sample arrives, the switch 130 is operated to couple the sample to the next data input up (not shown) in the sequence. When the −1 sample arrives, (the sample just before the 0th sample), the switch 130 is operated to connect bus 31 to input 107. When the 0th sample is present at the input to switch 130, the switch is operated to connect bus 31 to input 105.

Next, when the 1st sample arrives, the switch 130 recouples bus 31 to data input 109 such that the 1st sample is input to the analysis switch matrix on input 109. This process is continued until the Mth sample arrives and is coupled to input 105 and so on.

The commutator switch 132 used to implement the interpolators 124,126 through 129 shown in FIG. 12 works in the same way as switch 130 to reassemble the distributed sample sequences on outputs 120, 122 through 123 into a single sample sequence on bus 128 with a sample rate the same as the sample rate on bus 31. The switches 132 and 130 operate asynchronously however and there is no coordination between them. The notation used to define the symbols on outputs 120,122 and 123 also is different than the notation used to define the symbols in FIG. 11 to indicate this asynchronous nature of operation. In FIG. 12, the symbol on the left of the series is the earliest in time. In FIG. 11, the symbol identified as −(M−1) is the first symbol received. In FIG. 12, the symbol identified as 0 is the first symbol received. The switch arm 132 starts out in a position to couple output 123 to bus 128 when the first symbol (symbol 0) is received. The next symbol in time to be coupled to bus 128 is symbol 1 (not shown) which arrives on the next line up from line 123 (also not shown). The switch 132 continues to work its way up coupling each output line to bus 128 during successive symbol times which the M−1 symbol being the last symbol to be coupled to bus 128 before switch 132 re-connects line 123 to bus 128 to transmit symbol M thereto.

There are subclasses of perfect reconstructed filters such as "cosine modulated" and "lapped orthogonal". The specific perfect reconstruction filter that was selected for the preferred embodiment was a bank of linear phase perfect reconstruction filters. Any of the other subclasses of perfect reconstruction filters will also work as will a different number of analysis filters. The actual filter coefficients will be defined by the fact that 256 filters are used, each filter having 312 coefficients. The number of coefficients is also not critical, but 312 coefficients is believed now to be best. Any IIR perfect reconstruction filter will also suffice to practice the invention. The filter frequency response characteristics should overlap however to prevent blind spots regardless of whether FIR or IIR perfect reconstruction filters are used and regardless of which subclass is selected regardless of the number of filters or coefficients used.

Equalization

Because the number of analysis filters used is not infinite and because the analysis and reconstruction filters are not perfect, there will be some residual noise at the output of the excision circuitry on bus 128 in FIG. 10. This residual noise can be modelled as colored noise, i.e., noise which has some correlation.

Figure 13:
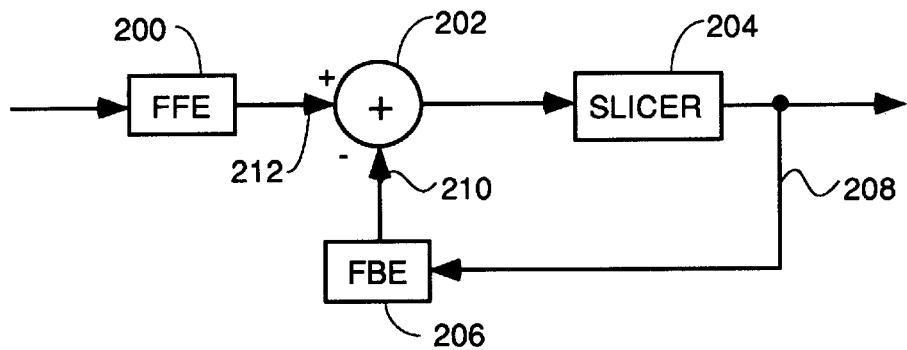
FIG. 13 is a diagram of a prior art DFE equalizer.

To understand the inventive equalizer, consider the prior art DFE equalizer structure shown in FIG. 13. This structure is comprised of a feed forward equalizer 200 receiving input data, processing it and outputting revised data driving one input of a summer 202. The difference input 210 of the summer 202 is driven by a feedback equalizer 206 which takes its input from the output of a slicer 204 which has an input driven by the output of the summer.

The basic concept upon which the inventive equalizer is built is to "whiten" any colored noise on bus 212 by making modifications to the prior art equalizer. Colored noise will result on bus 212 if narrowband interference is present or even if narrowband interference is not present but FFE 200 is not perfect.

Figure 14:
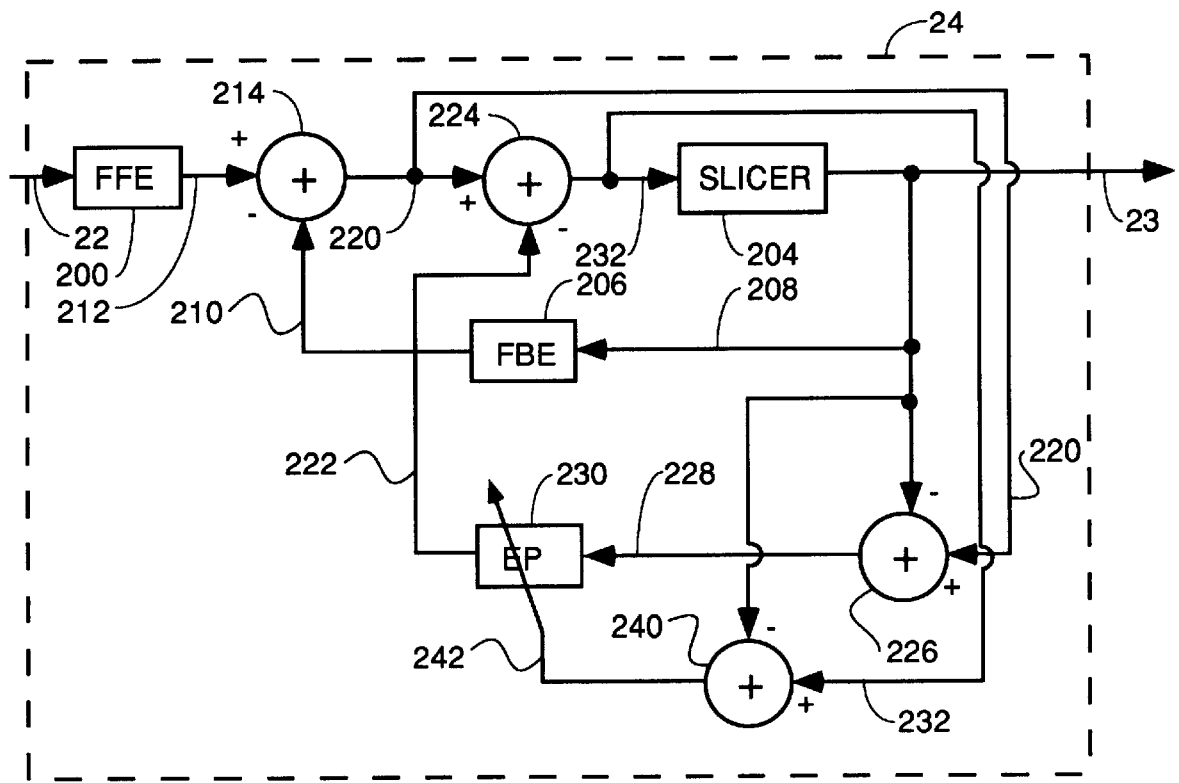
FIG. 14 is a diagram of a preferred form of equalizer for use in broadband digital communication systems to eliminate colored noise from the input of a slicer by using an error predictor circuit.

The general scheme of modification to the prior art DFE equalizer to whiten the noise on bus 212 is to add an error prediction circuit which functions to predict the next colored noise interval from the previous colored noise interval. The arrangement for the preferred form of equalizer is shown in FIG. 14. Data enters the equalizer 24 on line 22 and is processed by a conventional feed forward equalizer 200. The output of the feed forward equalizer on line 212 is coupled to the noninverting input of a summer 214. The inverting input 210 of summer 214 is coupled to the output of conventional feedback equalizer 206. The input 208 of the feedback equalizer is coupled to the output of a conventional slicer 204.

The output of the summer 214 on bus 220 has digital samples that define a signal which has both payload data plus white noise plus colored noise. It is the function of the equalizer 24 to "whiten" the colored noise so that it does not adversely affect detection of each symbol by the slicer.

The way the equalizer whitens the colored noise is as follows. First, the input samples on bus 22 are processed by the feed forward equalizer 200 in a conventional manner to compensate for some impairments in the channel. The output of the feed forward equalizer on bus 212 is summed with the output on bus 210 of a feedback equalizer 206 in summer 214 in a conventional manner. The output of summer 214 on bus 220 is summed with correction data on bus 222 in summer 224, and the output data is input to conventional slicer 204. The slicer outputs the actual data transmitted. The data on bus 23 is applied to the input 208 of the feedback equalizer 206 which processes it in conventional fashion to generate the feedback equalization data on bus 210.

The whitening of the colored noise starts by coupling the signals on bus 220 to the noninverting input of a summer 226. The signals on bus 220 will include data, white noise and colored noise. Simultaneously, the output data from the slicer on bus 23, which is data only, is coupled to the inverting input of the summer 226. The summer 226 functions to subtract the data only signal on bus 23 from the combined data, white noise and colored noise signals on bus 220. The resulting signals on bus 228 are white noise and colored noise only. These signals are input to an error predictor circuit 230.

Figure 15:
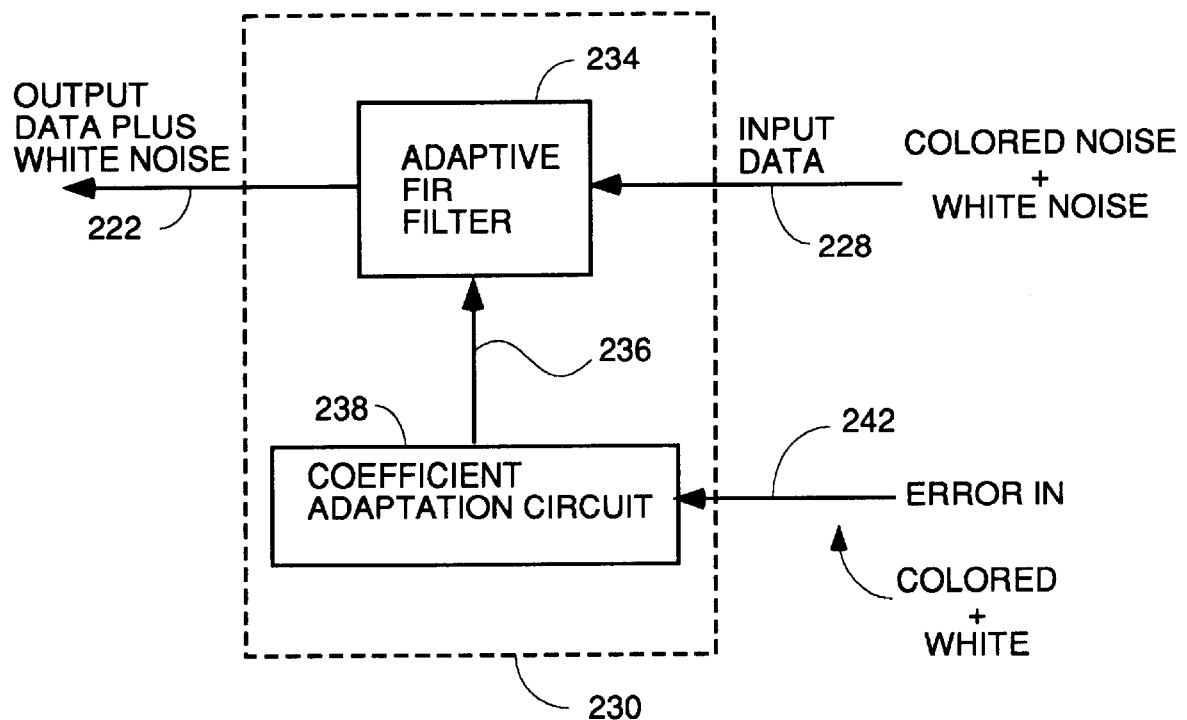
FIG. 15 is a diagram of a preferred form of error predictor for use in the equalizer of FIG. 14.

The error predictor circuit is an adaptive digital FIR filter which has its coefficients adapted by the process of correlation of the colored noise. FIG. 15 is a block diagram of the error predictor 230. The function of the error predictor circuit is to adapt the coefficients of its FIR filter in accordance with the correlation of the colored noise so as to predict the colored noise. The resulting data output on bus 222 is applied to the inverting input of summer 224 to subtract out the colored noise from the signals on bus 220 so as to eliminate colored noise at the input 232 of the slicer. In FIG. 15, the adaptive FIR filter is shown at 234. Its input is coupled to receive the white noise and colored noise signals on bus 228. The coefficients of the FIR filter are adjusted by data on bus 236 output by a coefficient adaptation circuit 238.

Referring again to FIG. 14, a summer 240 receives the data plus white noise plus some colored noise on bus 232 (assuming the colored noise has not yet been canceled). The inverting input of summer 240 is coupled to bus 23 to receive the data. The summer subtracts this data from the data, white noise and colored noise on bus 232 to output a signal on bus 242 which is white noise and any residual colored noise. The signals on bus 242 are input to the coefficient adaptation circuit 238 in FIG. 15. If there is any residual colored noise on bus 242, the coefficient adaptation circuit 238 will generate a nonzero correlation signal on bus 236 thereby adapting the coefficients of the filter 234 in a direction to generate an output signal on bus 222 which is data and white noise and causes summer 224 to subtract out at least some of the colored noise on bus 220. The adaption process continues changing the coefficients of the filter 234 until a signal on bus 222 causes cancellation of all the colored noise at the input 232 of the slicer. This is the desired state of convergence since the power of the colored noise is now minimum. Thus, when the convergence process has been completed, the signals on bus 232 will be data plus white noise only, and the signals on bus 242 will be white noise only. Since white noise has no convergence value between samples, the output of the correlator on bus 236 will be zero so no further adaptation of the filter coefficients occurs between samples. This causes the filter output on bus 222 to remain at a stable sample value adequate to remove colored noise from the signals on bus 220. When the colored noise correlation properties of the signals on bus 220 change from what they were to cause the convergence, the convergence process starts again until the new or altered colored noise signals are removed from the input signals to the slicer by summer 224.

Although the invention has been described in terms of the preferred and alternative embodiments disclosed herein, those skilled in the art will appreciate numerous modifications and improvements without departing from the spirit and scope of the invention. All such modifications and improvements are intended to be included within the scope of the claims appended hereto.

What is claimed is:

1. A process of removing narrowband interference signals from transmitted signals, comprising:

using a bank of perfect reconstruction or near perfect reconstruction narrow digital passband analysis filters with low sidelobes to divide the transmitted signal up into a plurality of narrow sub band signals with sufficiently overlapping passbands to avoid blind spots or spots of limited sensitivity in the broadband spectrum to be analyzed for the presence of narrowband noise;

analyzing the signals in each sub band to determine if a narrowband interference source is present in said sub band;

removing or attenuating all narrowband interference signals from each sub band in which an interfering signal is found; and using a bank of perfect reconstruction or near perfect reconstruction digital synthesis filters to reconstruct the transmitted signal from the individual sub band signals after any narrowband interference signals have been removed or attenuated.

2. The process of claim 1 wherein the step of dividing the transmitted signal into sub band comprises the step of passing the transmitted signal through a bank of polyphase filters with overlapping frequency responses and different center frequencies.

3. The process of claim 1 wherein the step of dividing the transmitted signal into sub band comprises the step of passing the transmitted signal through a first filter bank comprised of a bank of perfect or near perfect polyphase, finite impulse response reconstruction filters, and wherein the step of using a bank of perfect reconstruction or near perfect reconstruction digital synthesis filters comprises the step of using synthesis filters which have a transfer function which is the inverse of the transfer function of a paired one of said analysis filters.

4. The process of claim 1 wherein the step of analyzing the signals in each sub band comprises the step of calculating the average absolute amplitude or power of the signals in each sub band and determining if the computed average absolute amplitude or power within the sub band exceeds a reference which can be the average of the average absolute amplitude, if the sub band average absolute amplitude was computed, or the average of the average power of the other sub bands, or some other threshold which is selected to indicate when most interfering signals are present within a sub band, an interfering signal being deemed to be present within a sub band when said average absolute amplitude or average power of said sub band exceeds said reference by more than a predetermined noise threshold amount.

5. The process of claim 1 wherein said step of analyzing the signals in each sub band comprises the steps of calculating the average power in each sub band and then determining if the average power of said sub band exceeds a threshold amount which is set to detect most instances of narrowband interference.

6. The process of claim 1 wherein said step of analyzing the signals in each sub band comprises the steps of calculating the average power in each sub band and then comparing the power of every frequency component in said sub band to the average power for the sub band to determine if any frequency component has a power which is greater than the average power in said sub band by more than a predetermined amount.

7. The process of claim 1 wherein the step of analyzing the signals in each sub band comprises the step of calculating the average amplitude level of the signals in each subband and determining if any signal peak absolute amplitude within the sub band exceeds the average power level within that sub band by more than a predetermined noise threshold amount.

8. The process of claim 1 wherein the step of analyzing the signals in each sub band comprises the step of calculating a FFT of the signals in each sub band and determining if any frequency component within the sub band has a magnitude which exceeds the average amplitude level within that sub band by more than a predetermined noise threshold amount.

9. A process of removing narrowband interference signals from transmitted signals, comprising:

dividing the transmitted signal up into a plurality of narrow sub band signals with sufficiently overlapping frequency limits to avoid blind spots or spots of limited sensitivity in the broadband spectrum to be analyzed for the presence of narrow band noise;

analyzing the signals in each sub band to determine if a narrow band interference source is present in said sub band;

removing or attenuating all narrow band interference sources from all sub bands in which they are found; and reconstructing the transmitted signal from the individual sub band signals after any narrowband interference signals have been removed; and wherein the step of analyzing the signals in each sub band comprises the step of calculating the variance of the amplitude or power of the signals in each sub band and determining if the variance within the sub band has a magnitude which exceeds an acceptable level of variance.

10. The process of claim 9 wherein the acceptable level of variance is programmable.

11. The process of claim 1 wherein the step of removing all narrowband interference sources from all sub bands comprises the step of setting the amplitude of all signals in any sub bands with a narrowband interference source present to zero.

12. The process of claim 1 wherein the step of removing all narrowband interference sources from all sub bands comprises the step of adapting the coefficients of a digital narrow band notch filter so as to have a center frequency substantially equal to the center frequency of the narrow band interferences source.

13. The process of claim 1 further comprising the step of passing the output signal from said perfect reconstruction or near perfect reconstruction digital synthesis filters through an equalizer circuit which has been modified by addition of an error prediction means for predicting a next colored noise interval from the previous colored noise interval, said modified equalizer circuit functioning to whitening any colored noise in the output signal from said synthesis filters prior to detection in a slicer, and wherein the step of using a bank of perfect reconstruction or near perfect reconstruction narrow digital passband analysis filters with low sidelobes to divide the transmitted signal up into a plurality of sub bands includes the step of decimating the output signal sample stream from each said analysis filter to reduce the number of samples in each sub band which are analyzed for the presence of an interference signal, and wherein the step of reconstructing a transmitted signal from the individual sub bands signals comprises using an interpolator for each sub band sample stream to raise the sample rate prior to passing the subband signals after narrow band interferences signals have been removed or attenuated through said bank of synthesis filters.

14. A narrowband interference signal excision circuit, comprising:

a bank of perfect or near perfect reconstruction filters connected in parallel to have a shared input for receiving a transmitted signal and a shared output at which a reconstructed transmitted signal is output, said bank comprised of a plurality of individual perfect or near perfect reconstruction filters each having an analysis filter with an input coupled to said shared input and an output and a synthesis filter having an input and having an output coupled to said shared output, said bank of filters having an overall frequency response which covers the spectrum of said transmitted signals and which is comprised of a plurality of individual overlapping frequency responses of the individual filters, each having a different center frequency; and a detection and cancellation matrix comprised of a plurality of individual detection and cancellation circuits, each having an input coupled to an output of a different analysis filter and an output coupled to an input of a different synthesis filter, each detection and cancellation circuit comprising a first means for setting the amplitude of the input signal to the synthesis filter to which the detection and cancellation circuit is connected to zero or attenuating some or all of the frequencies in the signal from the output of said analysis filter in a first state, and, in a second state, coupling the output of said analysis filter to the input of the synthesis filter without attenuation, and a second means for determining if a narrowband interference signal is present in the output from the analysis filter to which it is connected, and, if not, causing said first means to enter said second state, and, if so, causing said first means to enter said first state.

15. The apparatus of claim 14 wherein said perfect or near perfect reconstructions filters are cosine modulated type perfect reconstruction filters, and the number of said filters is set based upon the bandwidth of the input signal and the average bandwidth of the interfering signals such that the bandwidth of each sub band is small enough to not result in loss of significants amounts of data which is not corrupted by noise when an interfering signal is found in said sub band.

16. The apparatus of claim 14 wherein the perfect reconstruction filters are implemented using a polyphase filter implementation making use of the Noble Identity such that the transmitted input signal samples are first processed by decimators so as to be decimated by a factor of M and then filtered into individual subbands using a matrix of polyphase analysis filters, with the output signals of said detection and cancellation circuits being filtered by a matrix of polyphase filters to implement said bank of synthesis filters with the outputs of the polyphase synthesis filters increased in sample rate by a plurality of interpolators.

17. The apparatus of claim 16 wherein said decimators and interpolators take the form of commutating switches.

18. The apparatus of claim 14 wherein said first means in each detection and cancellation circuit is a switch having an output coupled to the input of the synthesis filter to which said detection and cancellation circuit is connected and having two inputs, a first of which is coupled to the output of the analysis filter to which the detection and cancellation circuit is coupled and the second of which is coupled to ground, and wherein said switch functions to couple said switch output to said first input when no narrow band interference signal is detected and functions to couple said switch output to said second input when a narrow band interference signal is detected.

19. The apparatus of claim 14 wherein said second means in each detection and cancellation circuit is a processor programmed to calculate the average absolute amplitude of the signals output from said analysis filter at each frequency in the sub band output by said analysis filter and to compare the amplitude of the signal output by said analysis filter at each frequency to said average and determine whether, at any frequency, the signal amplitude exceeds said average by more than a predetermined amount.

20. The apparatus of claim 14 wherein said second means in each detection and cancellation circuit is a processor programmed to calculate the average power of the signals output from said analysis filter at each frequency in the sub band output by said analysis filter and to compare the power of the signal output by said analysis filter at each frequency to said average power and determine whether, at any frequency, the signal power exceeds said average power by more than a predetermined amount.

21. The apparatus of claim 14 wherein said second means in each detection and cancellation circuit is a processor programmed to calculate the variance of the absolute amplitude or power of each of the signals output from said analysis filter in the sub band output by said analysis filter and to compare the variance of the signal output by said analysis filter and determine whether the signal variance exceeds a threshold.

22. The apparatus of claim 14 wherein said second means in each detection and cancellation circuit is a processor programmed to calculate the average of the absolute amplitude or power of each of the signals output from said analysis filter at each frequency in the subband output by said analysis filter and to compare the average of the subband to a reference which may be the average of the same type averages of all the other subbands, or a threshold level selected to detect the existence of most narrowband interference signals, and determine whether the bin average is greater than the reference by more than a predetermined amount.

23. A process for removing narrowband interference from a digital input signal sample stream, comprising:

passing said input sample stream through M decimators coupled in parallel to lower the sample rate by a factor of M;

filtering the output sample stream from each decimator using a digital polyphase passband analysis filter, each having filter coefficients to establish a sub band of frequencies centered on a different center frequency and so as to establish overlapping bandwidth with the sub bands established by each neighboring analysis filter;

analyzing the signals in each sub band to determine if an interfering signal is present in the sub band;

suppressing or eliminating at least the interfering signal in each sub band;

passing the sample stream of each sub band after any interfering signals have been removed or suppressed through a polyphase synthesis filter;

interpolating the output sample stream from each polyphase synthesis filter to raise the sample rate and re-create a sample stream that accurately represents the input signal but with the elimination or reduction of interference signals.

* * * * *